United States Patent [19]
Howell et al.

[11] B 3,916,016
[45] Oct. 28, 1975

[54] SELF-EXTINGUISHING POLYMER COMPOSITIONS CONTAINING BROMINATED ARYL BUTANES

[75] Inventors: Hilda Howell; Walter M. Kutz, both of Pittsburgh, Pa.

[73] Assignee: Koppers Company, Inc., Pittsburgh, Pa.

[22] Filed: Oct. 5, 1973

[21] Appl. No.: 403,996

[44] Published under the Trial Voluntary Protest Program on January 28, 1975 as document no. B 403,996.

Related U.S. Application Data

[62] Division of Ser. No. 296,116, Oct. 10, 1972, Pat. No. 3,826,766.

[52] U.S. Cl. ... 260/649 R; 260/2.5 FP; 260/2.5 BB; 260/2.5 HA; 260/2.5 HB; 260/45.7; 260/DIG. 24

[51] Int. Cl. .............................. C01C 25/18
[58] Field of Search ........................... 260/649 R

[56] References Cited
OTHER PUBLICATIONS
Adams et al., Organic Synthesis, 40 (1960), p. 86.

*Primary Examiner*—Howard T. Mars
*Attorney, Agent, or Firm*—Oscar B. Brumback

[57] ABSTRACT

Polymeric compositions are rendered self-extinguishing by incorporating therein from 0.1 to 15% by weight of a bromo-compound selected from 1,2,3,4-tetrabromo-1,4-diphenylbutane and p-phenylene-1,1'-bis(1,2,3,4-tetrabromo-4-phenylbutane).

1 Claim, No Drawings ves
SELF-EXTINGUISHING POLYMER COMPOSITIONS CONTAINING BROMINATED ARYL BUTANES This is a division of application Ser. No. 296,116, filed Oct. 10, 1972, now U.S. Pat. No. 3,826,766.

BACKGROUND OF THE DISCLOSURE

The use of halogenated hydrocarbons as flame-retardant additives for synthetic polymers is well known. The efficiency of these compounds is often measured as a function of the amount of halogenation of the compound. Thus, a dibromo or dichloro compound is often more efficient than a monobromo compound.

Many polyhalogenated compounds have been found to be useful in polymeric compositions. Thus, U.S. Pat. No. 3,058,926 teaches that 1,2,3,4-tetrabromobutane is a fire retardant for polystyrene.

It is also known that the addition of certain organic peroxides in addition to the polyhalogenated compounds sometimes acts synergistically to provide flame retardant compositions with polymeric materials. While many compounds have been found to be effective to render polymer composition self extinguishing, when they are used in amounts sufficient to achieve the desired degree of fire retardancy, the lumping and static properties of the polymers into which they are incorporated have been adversely affected, thus affecting the molding properties.

It is therefore desirable to find brominated, organic compounds which can be incorporated into polymers in amounts sufficient to lend self-extinguishing characteristics to the polymer without harming its molding properties. According to this invention, it has been found that 1,2,3,4-tetrabromo-1,4-diphenylbutane and p-phenylene-1,1'-bis(1,2,3,4-tetrabromo-4-phenylbutane) render polymeric materials self-extinguishing while at the same time imparting anti-lump and antistatic properties to expandable polystyrene prepuff materials.

SUMMARY OF THE INVENTION

Polymeric compositions are rendered self-extinguishing by the incorporation of 0.1 to 15% by weight of a bromo-compound selected from 1,2,3,4-tetrabromo-1,4-diphenylbutane and p-phenylene-1,1'-bis(1,2,3,4-tetrabromo-4-phenylbutane). The polymer compositions rendered self-extinguishing according to the invention include poly(alpha-olefins), poly(vinyl aromatics), and copolymers thereof.

DETAILED DESCRIPTION OF THE INVENTION

The brominated aryl butanes of the present invention are relatively high melting solids which can be added to polymeric materials at normal processing temperatures without melting and consequently do not act to plasticize the polymers and cause the molding properties to deteriorate.

The 1,2,3,4-tetrabromo-1,4-diphenylbutane is a known compound, melting at 257° C. (compared to 118° C. for 1,2,3,4-tetrabromobutae). This compound was prepared by bromination of 1,4-diphenyl-1,3-butadiene in chloroform solution. The starting diolefin is commercially available.

The p-phenylene-1,1'-bis(1,2,3,4-tetrabromo-4-phenybutane) is a novel compound prepared by bromination in sulfur dioxide of p-phenylene-1,1'-bis(4,-phenyl-1,3-butadiene). The tetraolefin is a known compound and was prepared by a method given in *Organic Synthesis*, Volume 40, p. 86, starting with p-xylylenebis(triphenylphosphonium chloride) and cinnamaldehyde. The phosphonium compound can be prepared by reacting p-xylylene dichloride with triphenylphosphine in dimethylformamide as outlined in *Organic Synthesis*, Volume 40, p. 85. The phosphonium compound is also commercially available. The octabromo-compound is an extremely high melting solid, m.p. 305° C. (crude).

Self-extinguishing, organic polymeric compositions are prepared according to the invention by incorporating the brominated aryl butanes into polymeric compositions such as polyvinylaromatics, polyalphaolefins, and copolymers thereof.

Polyvinylaromatics which may be rendered self-extinguishing include polymers of styrene, α-methylstyrene, nuclear-methylstyrene, chlorostyrene, p-tert-butylstyrene, and copolymers of these monomers with monor amounts (less than 50% by weight) of other copolymerizable monomers such as acrylonitrile, butadiene, maleic anhydride, maleic acid and the like.

Polyalphaolefins which may be rendered self-extinguishing include polyporpylene, poly(pentane-1), poly(butene-1). and copolymers thereof.

While effective in both foamed and non-foamed polymer, the self-extinguishing agents of the invention have been found to be particularly advantageous for use with polymer foams derived from vinyl aryl polymers such as polystyrene. A convenient form of polystyrene for molding into foamed particles is polystyrene beads prepared in aqueous suspension by a process such as described, for example, in U.S. Pat. No. 2,907,756 wherein a vinyl aryl monomer is polymerized in aqueous suspension in the presence of an initiator system of t-butyl perbenzoate and benzoyl peroxide at a fixed time temperature cycle using suspending agents to maintain the monomers suspended in the aqueous medium in the form of particles or beads.

The polymer particles prepared by suspension polymerization are rendered expandable by incorporating any suitable blowing agent to the particles either during or after the polymerization. Processes for such incorporation are described in U.S. Pat. Nos. 3,192,169 and 2,983,692. Preferred blowing agents include volatile aliphatic hydrocarbons containing from 1 to 7 carbon atoms in the molecule, i.e., ethane, methane, propane, butane, pentane, isopentane, hexane, heptane, cyclohexane, and their halogenated derivatives which boil at a temperature below the softening point of the polymer. Usually, from about 3 to 20% by weight of the polymer of the blowing agent is incorporated therein.

The particular manner in which the bromo-compounds are incorporated is not critical to the present invention.

The self extinguishing additives of the present invention are high melting, solid compounds which can be added to a variety of polymeric compositions in a variety of ways. Because of the high melting properties, the additives can be incorporated into the heat plastified polymers by mixing in conventional mixing and extruding equipment prior to molding the polymer or while processing the polymer into pellets, which are a convenient form for molding. The hydrolytic stability of the additives toward conditions of impregnation (vis. 10 hours at 90° C. or 6–8 hours at 115° C.) allow them to be added to the polymerization recipe prior to the formation of the polymeric materials, or to be added to the preformed polymer during impregnation with a blowing agent in an aqueous suspension. Incorporation of the additives can also be accomplished by simple dry blending of the polymer with the additives prior to molding or by intimately blending a solution of the additives into the polymeric material followed by compression molding.

The self-extinguishing agents are incorporated into the polymeric compositions in an effective amount sufficient to render the polymer self-extinguishing, generally in amounts of from 0.1 to 15% by weight, based on polymer. Amounts of about 2% or more by weight of polymer of the self-extinguishing agents are required when the agent is used by itself. When organic peroxide synergists, such as dicumyl peroxide, 2,5-dimethyl-2,5-di(tert-butylperoxy)-hexyne-3, di-tert-butyl peroxide, and so forth, are used in preparing the self-extinguishing compositions, then amounts as low as about 0.1% self-extinguishing agent can be used.

The invention is further illustrated by the following examples:

EXAMPLE I

Preparation of 1,2,3,4-tetrabromo-1,4-diphenylbutane

To a 1 liter, 3-necked, baffled flask equipped with a magnetic stirrer, thermometer, addition funnel, and cooling bath, was added 50 g. of 1,4-diphenyl-1, 3-butadiene (Aldrich Chemical Co.) and 350 ml. chloroform. The solution was cooled to 18° C., and 25 ml. of bromine was added dropwise at such a rate that the bromine color disappeared between each drop of the addition. A sun lamp, mounted 6 inches from the flask, was used to activate the bromine. The first half of the bromine reacted immediately upon addition, but further reaction appeared considerably inhibited. The temperature was raised to 20° C. and addition of the remaining bromine continued at 20°–40° C. over a period of 3–4 hours. The mixture was stirred overnight at room temperature, filtered, the precipitate washed with fresh chloroform and air dried. The product was a white crystalline solid, melting at 275° C. with decomposition.

EXAMPLE II

Preparation of p-phenylene-1,1'-bis(4-phenyl-1,3-butadiene)

This starting material was prepared following the procedure given in Organic Synthesis, Volume 40, page 86 as follows: to a solution of 70 g. of p-xylyene-bis(triphenylphosphonium chloride) purchased from Columbia Organic Chemicals Company, Inc., and 35 g. of cinnamaldehyde in 250 ml. of ethanol was added a solution of 0.25M. lithium ethoxide in ethanol. After being allowed to stand overnight at room temperature the yellow solid was colleceted by filtration, washed with 300ml. of 60% ethanol, and dried in a vacuum oven at 20 mm. and 70° C. Crude crystals, m.p. in 270° C. were obtained in 80% yield.

Preparation of p-phenylene-1,1'-bis (1,2,3,4-tetrabromo-4-phenylbutane)

This novel was prepared by bromination of the crude crystals of p-phenylene-1,1'-bis (4-phenyl-1,3-butadiene) prepared above. The crude crystals, 22 g., and 340 ml. of sulfur dioxide were charged to a 3-neck, 100-ml., baffled flask equipped with a magnetic stirrer, thermometer, addition funnel, nitrogen blanket and dry ice cooling bath. The level of sulfur dioxide was kept more or less constant by continual addition from a supply tank. Bromine, 42.1 g., was added dropwise at such a rate that the bromine color disappeared between each drop of the addition. Reaction temperature was kept between −20° and−10° C. Total reaction time for the bromine was 40 minutes. The reaction mixture was then allowed to come to room temperature, with stirring, over 2.5 hours during which time the solvent evaporated. Pentane, 200 ml., was added and stirring continued another 2 hours. The product was filtered, washed with fresh pentane, and dried overnight in a vacuum oven at room temperature to give 56.8 g. (88% yield) of curde p-phenylene- ,1'-bis(1,2,3,4-tetrabromo-4-phenylbutane), m.p. 283°–5° C. The crude octabromide was purified by leaching with chloroform to give a product melting at 305° C. with decomposition starting at 200° C. Infrared analysis was consistent for the expected octabromide. Elemental analysis of the crude product gave carbon calculated 32.07, found 33.56; hydrogen, calculated 2.28, Found 2.31; and bromine, calculated 65.65, found 63.76.

EXAMPLE III

To illustrate the effect of the self-extinguishing agents on the flammability of polystyrene foam when used without synergistic peroxides, the agents were added to the polystyrene beads by two different methods.

In the first method, hereinafter called "dry blend", the polystyrene beads containing 8.5% pentane were tumbled in a closed container with the agents. The material was then pre-expanded by heating to a bulk density of 1.0–2.5 pounds per cubic foot, and allowed to stand overnight.

In the second method, hereinafter called "Impregnation," the polystyrene beads were suspended in water in the presence of a surfactant, such as a mixture of tricalcium phosphate and sodium dodecylbenzenesulfonate, the self-extinguishing agent, and pentane and heated for 10 hours at 90° C. The suspension was then neutralized with hydrochloric acid and the beads separated, dried and pre-expanded to a bulk density of 1.0 − 2.5 pounds per cubic foot.

In both methods, the pre-expanded beads were then molded, cut into strips 1 × 5 × ½ inches and placed in a vacuum oven to remove the residual pentane and tested for flammability as follows:

The specimen strips were hung lengthwise from a clamp over a microburner having a ¾ inch yellow flame. The flame was positioned ¾ inches from the bottom edge of the foam sample for 3 seconds. The flame was then removed and the time in seconds measured until the burning foam strip extinguished itself, i.e., the time the test sample burned in the absence of the applied flame. The results of the tests for 1,2,3,4-tetrabromo-1,4,-diphenylbutane (A) and p-phenylene-1,1'-bis (1,2,3,4-tetrabromo-4-phenylbutane) (B) at the concentrations shown are reported in Table I as Vertical Burn Time (secs.). Because the 1,2,3,4-tetrabromobutane (C) was reported to be a self-extinguishing agent in U.S. Pat. No. 3,058,926 and it has the same structure as the agents of this invention except for the phenyl groups on the end of the molecule, the tetrabromobutane was included in the tests for comparison purposes.

Table I

| Experiment No. | S. E. Agent, Concentration (%) | Method of Addition | Vertical burn time, secs. |
|---|---|---|---|
| III-1 | A, 2.0 | Impregnation | 2.4 |
| III-2 | A, 4.0 | Impregnation | 1.8 |
| III-3 | A, 4.0 | Dry Blend | 0.85 |
| III-4 | B, 1.0 | Impregnation | >7.3 |
| III-5 | B, 1.5 | Impregnation | 6.5 |
| III-6 | B, 4.0 | Dry Blend | 0 |
| III-7 | C, 2.0 | Impregnation | Complete burn |
| III-8 | C, 4.0 | Dry Blend | 8.6 |
| III-9 | C, 4.0 | Impregnation | >10 |

The results indicate that the use of the phenyl substituted bromo compounds of the instant invention are efficient at concentrations greater than 2.0% by weight, while the unsubstituted tetrabromobutane is still unsatisfactory at the 4.0% level. It should be noted from experiments III-1, III-4, and III-5 that the use of the phenylsubstituted compounds without synergist is not satisfactory at concentrations of from 1-2% by weight.

EXAMPLE IV

To illustrate the effect of peroxide synergists on the self-extinguishing properties of 1,2,3,4-tetrabromo-1,4-diphenylbutane (A) and p-phenylene-1,1'-bis-(1,2,3,4-tetrabromo-4-phenylbutane) (B) a series of samples were made up by the methods outlined in Example III with the addition of either 0.30% based on polystyrene of 2,5-dimethyl-2,5-di(tert-butylperoxy)-3-hexyne (C) or 0.35% based on polystyrene of 1,3-bis(alpha-tert-butylperoxyisopropyl) benzene (D). The results of the vertical flame-out test are reported in Table II as before. Again, for comparison purposes, results with 1,2,3,4-tetrabromobutane (E) have been included.

Table II

| Experiment No. | Agent Added, Concentrations | Peroxide Added | Method of Addition | Vertical burn time, secs. |
|---|---|---|---|---|
| IV-1 | A, 0.3 | D | Dry Blend | 0.46 |
| IV-2 | A, 0.5 | C | Impregnation | 0.90 |
| IV-3 | A, 1.0 | C | Impregnation | 0.60 |
| IV-4 | A, 1.0 | D | Dry Blend | 0.13 |
| IV-5 | A, 3.0 | C | Impregnation | 0.50 |
| IV-6 | B, 0.2 | D | Dry Blend | 1.25 |
| IV-7 | B, 0.5 | D | Dry Blend | 0.75 |
| IV-8 | B, 1.0 | D | Dry Blend | 0.33 |
| IV-9 | E, 0.5 | C | Impregnation | >8.0 |
| IV-10 | E, 0.5 | D | Dry Blend | 2.14 |
| IV-11 | E, 1.0 | C | Impregnation | >4.0 |
| IV-12 | E, 3.0 | C | Impregnation | 3.0 |

Again, while experiments IV-9 through IV-12 indicated that the unsubstituted tetrabromobutane is unsatisfactory even with peroxide, the phenylsubstituted agents of this invention are satisfactory at concentrations below 0.3% by weight. It should also be noted that during the pre-expansion of the material in experiment IV-10, over 90% of the beads were clumped together whereas none of the materials in experiments IV-1 through IV-8 had lumping. The bromocompounds of the present invention are thus seen to have anti-lump properties as well as self-extinguishing properties.

EXAMPLE V

To illustrate the flame retardant properties of the compounds of the invention in other polymers, the following series of experiments was undertaken:

Method A - The powdered polymer was mixed with the desired amount of 1,2,3,4-tetrabromo-1,4-diphenylbutane (C) or p-phenylene-1,1'-bis (1,2,3,4-tetrabromo-4-phenylbutane) (D) and then molded in a compression press at 350° F. to form a film. The films were cut up and remolded four times to ensure good mixing and blending of the polymer and the additive.

Method B - The polymer and the additives were dissolved in methylene chloride. The solvent was allowed to evaporate in a vacuum to leave a foamed film of the polymer containing the additive.

The films formed by either of the above methods were mounted vertically and ignited in a draft-free hood, the ignition flame removed after 3 seconds, and the time lapsed between the removal of the flame and flame-out noted. The results are shown in Table III.

TABLE III

| Polymer of | S. E. Agent Concentration (%) | Peroxide* Added | Method of Addition | Vertical burn time, secs. |
|---|---|---|---|---|
| Propylene | C, 2.5 | — | A | 0.3 |
| | C, 2.5 | 0.4 | A | 0.42 |
| | C, 5.0 | — | A | 0.83 |
| | C, 5.0 | 0.4 | A | 0.26 |
| | D, 2.5 | — | A | 0.1 |
| | D, 2.5 | 0.4 | A | 0.25 |
| | D, 5.0 | — | A | 0.5 |
| | D, 5.0 | 0.4 | A | 0.5 |
| Styrene-acrylonitrile (70-30) | C, 5.0 | 0.4 | B | 1.0 |
| | C, 10.0 | — | B | <0.5 |
| | D, 5.0 | 0.4 | B | <0.5 |
| | D, 10.0 | — | B | <0.5 |
| Styrene-methyl acid maleate (90-10) | C, 5.0 | 0.4 | B | <0.5 |
| | C, 10.0 | — | B | <0.5 |
| | D, 5.0 | 0.4 | B | <0.5 |
| | D, 10.0 | — | B | <0.5 |

* peroxide was 1,3-bis(α-tert-butylperoxyisopropyl)benzene

What is claimed is:
1. p-Phenylene-1,1'-bis(1,2,3,4-tetrabromo-4-phenylbutane).

* * * * *